Jan. 17, 1956  J. E. SOCKE  2,731,132
CAN BODY SUPPORT WITH CONVEYOR WEARING TRACKS
Filed Aug. 26, 1952
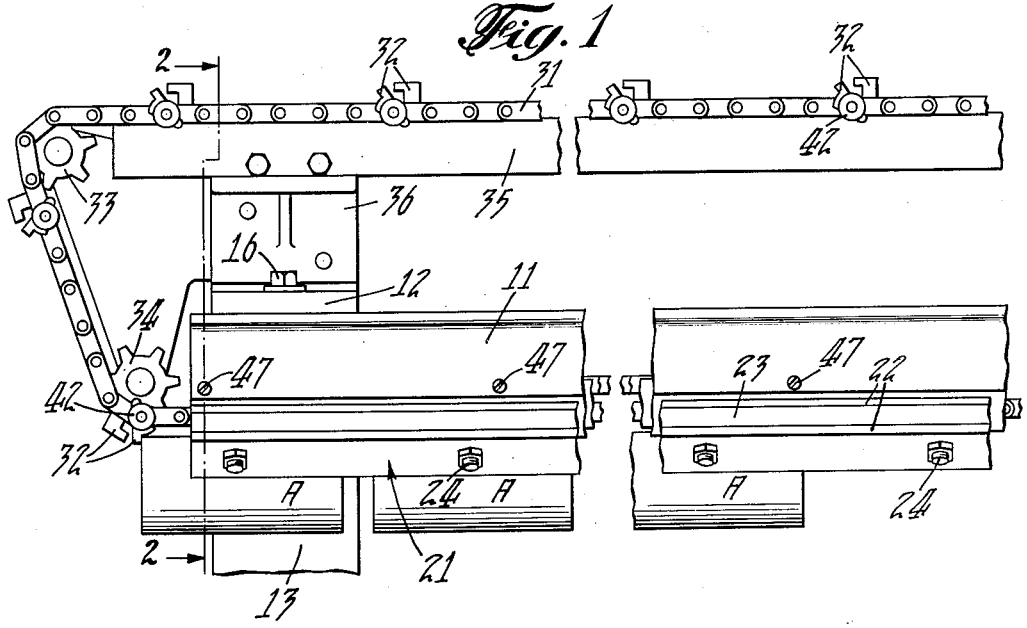
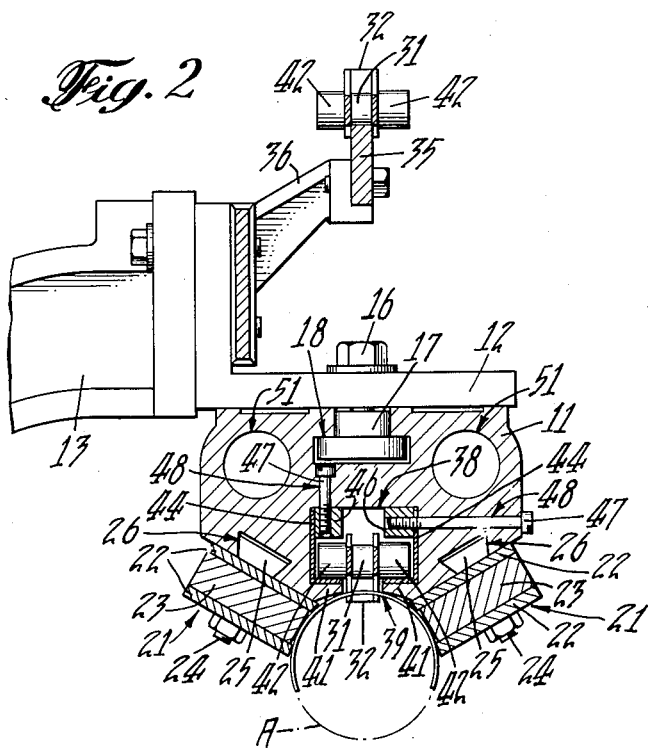
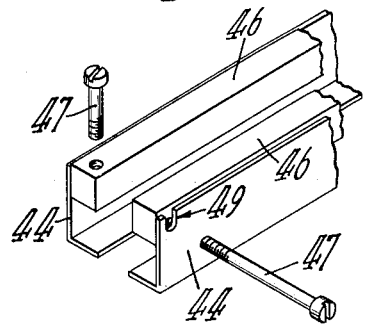
INVENTOR.
JOHN E. SOCKE
BY Charles H. Erne
Leland R. McCann
George W. Reiber
ATTORNEYS

United States Patent Office 2,731,132
Patented Jan. 17, 1956

2,731,132

CAN BODY SUPPORT WITH CONVEYOR WEARING TRACKS

John E. Socke, Pelham Manor, N. Y., assignor to American Can Company, New York, N. Y., a corporation of New Jersey Application August 26, 1952, Serial No. 306,415

4 Claims. (Cl. 198—41)

The present invention relates to a can body treating machine having a conveyor extending through a support for propelling can bodies along the support and has particular reference to devices for protecting the support against wear by the conveyor. This is a companion application to my copending United States application Serial Number 306,416, filed August 26, 1952, for Can Body Support Aligning Device, and Serial No. 306,418, filed August 26, 1952, for Can Body Making Machine With Improved Body Support Member and United States application Serial Number 306,335, filed August 26, 1952, for Can Body Support With Adjustable Rails, in the name of of Lloyd H. Weber.

In the manufacture of sheet metal cans or containers, the side seams of the can bodies, which comprise a substantial portion of a completed can, usually are soldered in machines in which the can bodies are propelled in spaced and timed processional order along a supporting horn or mandrel for the soldering and cooling operations. Frequently the horn or mandrel includes magnetic rails for supporting the can bodies during their advancement, the rails being suspended from a support member which usually includes a track for a conveyor utilized to advance the can bodies along the rails.

Recently it has been found that an extruded support member, preferably made of a soft material, such as aluminum, aluminum alloys, magnesium, etc., which can be readily extruded from a die, is much superior in many ways to support members made of relatively harder materials such as iron or steel. However, such an extruded soft material is not suitable for wearing surfaces which are subjected to considerable abrasion such as results from a traveling conveyor chain and the like.

The instant invention contemplates overcoming this difficulty by the provision of removable wearing plates in the portions of the extruded support member subjected to such excessive wear.

An object of the invention is the provision in a machine for treating can bodies, of a supporting device for supporting the can bodies while they are advanced by a traveling conveyor in spaced and processional order wherein the support member is provided with supplemental abrasion resisting conveyor tracks so that the support member may be made as a one piece extruded element designed to house and support the conveyor without damage due to abrasion caused by operation of the conveyor.

Another object is the provision of such an extruded support member wherein the supplemental conveyor tracks are removably held in place in such a manner as to facilitate replacement without damage to the support member.

Numerous other objects and advantages of the invention will be apparent as it is better understood from the following description, which, taken in connection with the accompanying drawings, discloses a preferred embodiment thereof.

Referring to the drawings:

Figure 1 is a fragmentary side elevation of principal parts of a can body treating machine embodying the instant invention;

Fig. 2 is an enlarged transverse sectional view taken substantially along the line 2—2 in Fig. 1, with parts broken away; and Fig. 3 is an enlarged fragmentary perspective view of the supplementary conveyor tracks used in the machine.

As a preferred or exemplary embodiment of the invention the drawings illustrate principal parts of a can body side seam soldering machine of the character disclosed in United States Patent 1,338,716 issued May 4, 1920 to Magnus E. Widell on Soldering Machine. In such a machine the can bodies to be treated are propelled along a straight line path of travel in a substantially continuous procession and in end-to-end spaced and timed relation, the can bodies being supported in an outside horn or mandrel for the various operations performed on them.

In the instant invention the drawings show an improved horn or mandrel unit which includes a one-piece extruded aluminum horn member 11 which extends longitudinally of the machine for its entire length. This member is suspended from a plurality of spaced angle brackets 12 secured at arms 13 which extend up from the frame of the machine at intervals along its length. The horn member 11 preferably is held in place by bolts 16 which extend through holes in the angle brackets 12 and which are threadedly engaged in T-shaped blocks 17 disposed in a T slot 18 formed in the top of the extruded soft metal horn member.

A pair of converging permanent magnet support rails 21 secured to the bottom of the horn member 11 support, by magnetic attraction, can bodies A to be treated. Each rail 21 comprises a pair of spaced and parallel pole plates 22 with a core plate 23 disposed between them and secured together to provide a unitary structure. The rails 21 extend along the entire length of the horn member 11 and are secured to the horn member by bolts 24 which are attached to wedge blocks 25 seated in longitudinal dovetail grooves 26 formed in the horn member. These rails 21 are disposed at a predetermined angle to each other so as to radially engage and hold in suspension the can bodies A.

The suspended can bodies A are propelled or advanced along the magnetic rails 21 in the usual spaced and processional order for treatment, for example side seam soldering, by an endless chain conveyor 31 having conventional can body gripper dogs 32 secured thereto at spaced intervals along the chain for engagement behind the can bodies in the procession. The conveyor 31 operates over vertically spaced sprockets 33, 34 disposed at each end of the machine and is actuated in any suitable manner, preferably as shown in the above mentioned Widell patent.

The upper run of the conveyor 31, intermediate the ends of the machine, rides on and is supported by a stationary support bar 35 which is secured to small brackets 36 which may be attached to the angle brackets 12. The lower run of the conveyor 31 is housed in and travels through a substantially rectangular channel 38 formed in the extruded horn member 11 adjacent its bottom face and located between the magnetic rails 21. A slot 39 formed in the bottom of the horn member 11 and communicating with the channel 38 provides a clearance space for the passage of the gripper dogs 32 as they advance the can bodies A along the rails. The slot 39 sets off on each side thereof a ledge 41 for the support of the conveyor chain 31. For this latter purpose, the chain 31 is provided with support rollers 42 which are secured to and project laterally from both sides of the conveyor. These rollers 42 are located adjacent the gripper dogs 32.

In order to prevent rapid or excessive wearing away of the ledges 41 in the soft aluminum horn member 11, the support rollers 42 of the conveyor 31 during their passage through the horn member, ride on relatively hard, L-shaped supplemental or reinforcing runways or tracks 44 (Figs. 2 and 3) which line the interior of the channel 38 adjacent its vertical side and horizontal bottom portions. These supplemental tracks 44 preferably are made of stainless steel sheet material and are held in place in the channel 38 in such a manner that they may be quickly removed for replacement. For this latter purpose, the lower horizontal legs of the L-shaped track members 44 rest on the ledges 41 of the horn member 11 and the vertical legs, adjacent their top edges are clamped against the vertical channel walls of the horn member by substantially square longitudinal clamping bars 46 which preferably extend the full length of the horn member.

The clamping bars 46 are held in clamping position by screws 47 which extend through non-threaded holes 48 formed in the horn member 11, the inner ends of the screws being threadedly engaged in the clamping bars. The screw holes 48 may be horizontal or vertical, or both as shown in Fig. 2. When horizontal screw holes 48 are used, U-shaped clearance recesses or slots 49 (Fig. 3) formed in the top edges of the L-shaped track 44 restrain the track against longitudinal displacement, and also permit of partially rotating the track member in the channel 38 after the chain has been removed and the screws 47 loosened. This is to effect the removal of the track member without removing the clamping bar 46. When the vertical screw holes 48 are used, the track member 44 may be readily withdrawn endwise from the channel 38 after loosening the clamping bar 46.

The clamping bars 46, preferably are made of stainless steel as in the instance of the track members 44, to withstand the abrasion of the conveyor support rollers 42 and are made of a size which will co-operate with the lower legs of the track members 44 in providing just sufficient clearance space therebetween to accommodate the rollers and confine them against undue vertical displacement. Thus the clamping bars 46 also serve as top guide members for guiding the support rollers 42 during their travel through the channel 38 in the horn member 11.

In this manner the relatively soft material extruded horn member 11 is protected against abrasion by the chain conveyor 31 and thus the horn member is insured of a long life. Such a manner of protecting the horn member 11 against destruction qualifies it for use in a machine of the character disclosed and makes it possible to take advantage of such a horn member that can be accurately extruded so that the formation of the T slot 18, the dovetail grooves 26, the channel 38, gripper dog clearance slot 39 and cooling conduits 51 may be effected simultaneously with the extruding of the horn member.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A support for a can body treating machine, comprising an elongated extruded horn member of relatively soft metal, said horn member being free of threaded holes and having a longitudinal extruded channel formed therein for receiving a movable conveyor, means secured to and extending longitudinally of said horn member for supporting can bodies advancing in endwise relation, a conveyor movable through said channel in said horn member for propelling said can bodies in processional order along said support means, a supplemental runway of relatively harder metal than said soft metal horn member disposed in and extending longitudinally of said channel for supporting said conveyor and for protecting the soft metal of said horn member against wear resulting from operation of said conveyor, and an extruded slot in said horn member spaced from said conveyor channel, said slot having means therein for removably securing said horn member to the machine frame at spaced localities along said slot without necessity for threaded holes in said horn member.

2. A support for a can body treating machine, comprising an elongated extruded aluminum metal horn member extending longitudinally of the machine, said horn member being free of threaded holes and having an extruded longitudinal channel formed therein setting off support ledges for receiving a movable conveyor, means secured to and extending longitudinally of said horn member for supporting can bodies advancing in endwise relation therealong, a conveyor movable through said channel in said horn member for propelling said can bodies in processional order along said support means, a pair of supplemental tracks of substantial L-shape disposed in said channel on said support ledges for supporting said conveyor, said supplemental tracks being composed of relatively hard metal for protecting said aluminum metal horn member against wear resulting from operation of said conveyor, and an extruded slot in said horn member spaced from said conveyor channel, said slot having means therein for removably securing said horn member to the machine frame at spaced localities along said slot without the necessity for threaded holes in said horn member.

3. A support for a can body treating machine, comprising an elongated extruded horn member of relatively soft metal extending longitudinally of the machine frame, said horn member being free of threaded holes and having a longitudinal extruded channel formed therein for receiving a movable conveyor, means secured to and extending along said horn member for supporting can bodies advancing therealong in endwise relation, a conveyor movable through said channel in said horn member for propelling said bodies in processional order along said support means, a pair of supplemental tracks of substantial L-shape disposed in said channel for supporting said movable conveyor, said supplemental tracks being composed of relatively hard metal for protecting said soft metal horn member against wear resulting from operation of said conveyor, means on said horn member extending into said channel for removably clamping said tracks in operative position within said channel, and an extruded T-slot in said horn member above said conveyor channel, said T-slot having T-shaped blocks therein provided with threaded holes for removably securing said horn member to the machine frame at spaced localities along said T-slot without necessitating the presence of threaded holes in said horn member.

4. A support for a can body treating machine, comprising a longitudinal extruded horn member of relatively soft material having a channel formed therein for a conveyor, support means secured to and extending along said horn member for supporting can bodies arranged in endwise relation, a conveyor movable through said channel in said horn member for propelling said bodies in processional order along said support means, said conveyor having laterally projecting rollers for supporting it during its passage through said channel, a pair of L-shaped supplemental tracks of relatively harder material than said horn member disposed in said channel and having horizontal legs for supporting the rollers of said conveyor and for protecting said horn member against wear and improper operation of said conveyor, and a clamping bar of relatively hard material disposed within said channel adjacent each of said tracks and secured to said horn member for removably clamping said tracks in operative position, said clamping bars being disposed in spaced relation to the horizontal legs of said tracks for confining said conveyor rollers against vertical displacement.

References Cited in the file of this patent

UNITED STATES PATENTS

| | | |
|---|---|---|
| 467,943 | Lockwood | Feb. 2, 1892 |
| 1,453,610 | Thornton | May 1, 1923 |
| 1,534,677 | Assmann | Apr. 21, 1925 |